(12) United States Patent
Takeno

(10) Patent No.: US 8,125,185 B2
(45) Date of Patent: Feb. 28, 2012

(54) METHOD FOR CHARGING NON-AQUEOUS ELECTROLYTE SECONDARY BATTERY

(75) Inventor: Mitsuhiro Takeno, Osaka (JP)

(73) Assignee: Panasonic Corporation, Osaka (JP)

( * ) Notice: Subject to any disclaimer, the term of this patent is extended or adjusted under 35 U.S.C. 154(b) by 855 days.

(21) Appl. No.: 12/196,451

(22) Filed: Aug. 22, 2008

(65) Prior Publication Data

US 2009/0066295 A1 Mar. 12, 2009

(30) Foreign Application Priority Data

Aug. 22, 2007 (JP) .................................. 2007-215469

(51) Int. Cl.
*H02J 7/00* (2006.01)
(52) U.S. Cl. ........ 320/130; 320/137; 320/138; 320/139; 429/231.95
(58) Field of Classification Search .................. 320/130, 320/137–139; 429/231.95, 223, 224
See application file for complete search history.

(56) References Cited

U.S. PATENT DOCUMENTS 6,081,097 A * 6/2000 Seri et al. ...................... 320/128
2006/0170397 A1* 8/2006 Srinivasan et al. ............. 320/132

FOREIGN PATENT DOCUMENTS

JP 08-124601 5/1996
JP 2000-133320 5/2000

OTHER PUBLICATIONS

Machine translation of JP 2000-133320.*

* cited by examiner

*Primary Examiner* — Samuel Berhanu
(74) *Attorney, Agent, or Firm* — McDermott Will & Emery LLP

(57) ABSTRACT

A method for charging a non-aqueous electrolyte secondary battery including the step of repeating pulse charging and charging pause, in which a pulse charging time is arbitrarily set between a lower limit value and an upper limit value, the lower limit value being an inverse time Tx of a frequency Fx of the high frequency side at which an imaginary part of an alternating current impedance of the non-aqueous electrolyte secondary battery is a first local maximum value, or of a frequency adjacent to Fx, and the upper limit value being an inverse time Ty of a frequency Fy at the low frequency side at which an imaginary part of the alternating current impedance of the non-aqueous electrolyte secondary battery is a second local maximum value, or of a frequency adjacent to Fy.

6 Claims, 4 Drawing Sheets

F I G. 1
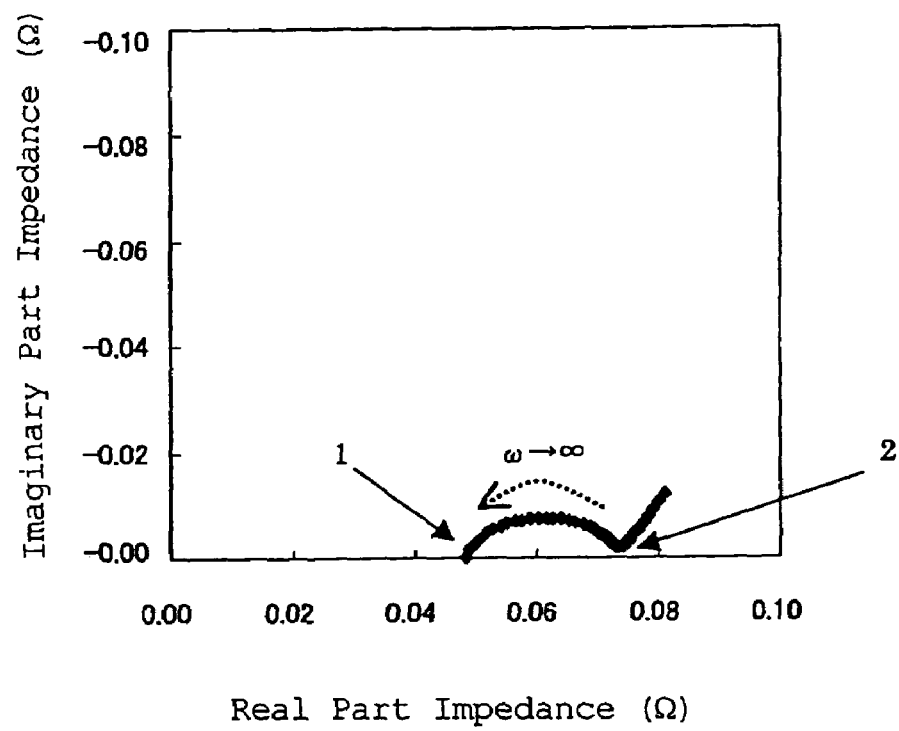

F I G. 4
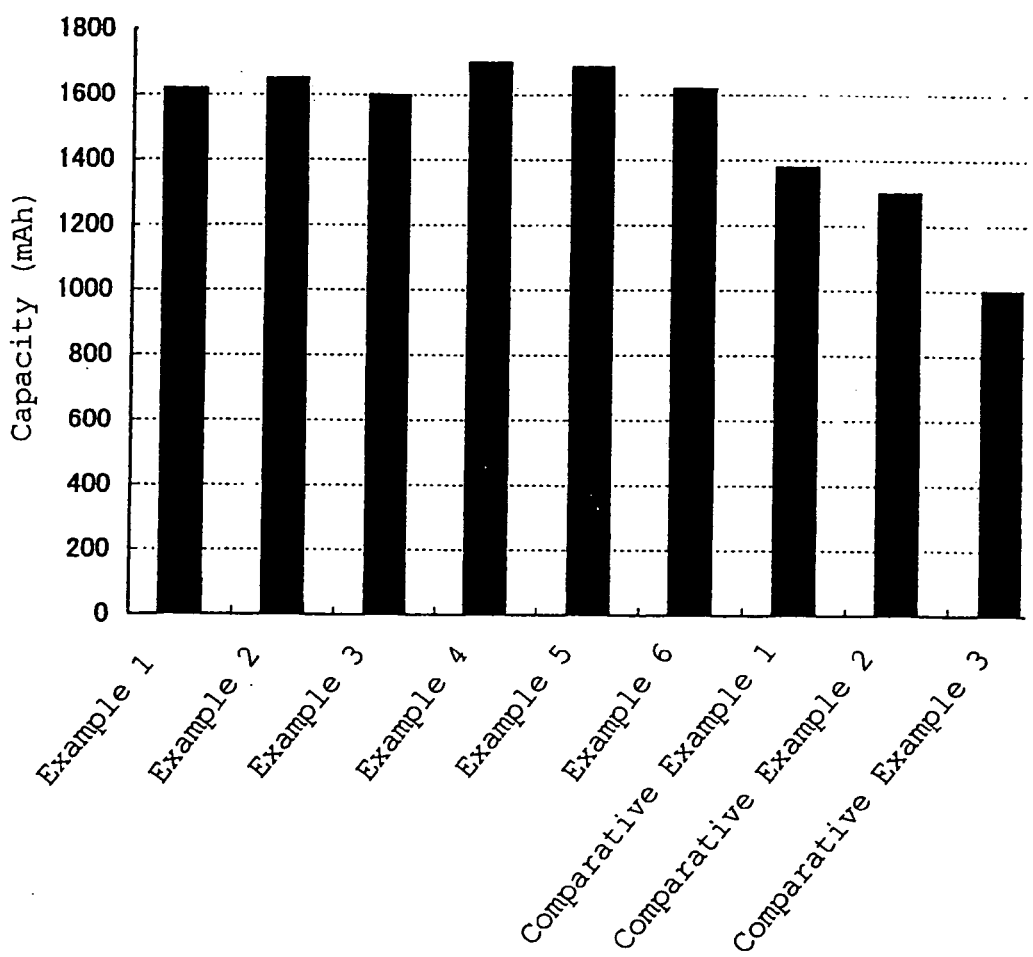

METHOD FOR CHARGING NON-AQUEOUS ELECTROLYTE SECONDARY BATTERY

FIELD OF THE INVENTION

The present invention relates to a method for charging a non-aqueous electrolyte secondary battery, and more specifically, to a method for charging a non-aqueous electrolyte secondary battery by alternately repeating pulse charging and charging pause.

BACKGROUND OF THE INVENTION

With the progression of portability and cordlessness of electronic equipments, as their driving power supply, compact and lightweight non-aqueous electrolyte secondary batteries having high energy density, particularly lithium ion secondary batteries, are attracting attention. A typical lithium ion secondary battery is provided with: a positive electrode including a layered compound such as a lithium cobalt oxide; and a negative electrode including a material capable of absorbing and desorbing lithium such as graphite. Between the positive electrode and the negative electrode, a separator is interposed, which serves to electrically insulate these as well as retain a non-aqueous electrolyte. For the non-aqueous electrolyte, a non-aqueous solvent containing a lithium salt dissolved therein is used. In a number of aqueous secondary batteries, a battery voltage is no greater than 2 V, whereas lithium-ion secondary batteries have a battery voltage of about 4 V and also a high energy density. Thus, lithium-ion secondary batteries are used in a number of portable equipments.

In nickel-cadmium batteries and nickel-metal hydride batteries, a constant current charging method in which charging is performed at a constant current, a constant voltage charging method in which charging is performed at a constant voltage, or a $-\Delta$ V charging method in which charging is performed while also detecting reduction in charging voltage associated with oxygen absorption, is mainstream. On the other hand, in lithium-ion secondary batteries, a constant current-constant voltage charging method which is a combination of the above, or a pulse charging method, is performed.

In the constant current-constant voltage charging method, charging is performed at a constant current until the battery voltage becomes an upper limit value, and subsequently, charging is performed at a constant voltage until the current value is reduced to a predetermined value. In the pulse charging method, charging is performed by alternately repeating quick pulse charging and charging pause.

If a battery voltage is detected during charging in the pulse charging method, a difference occurs in the detected voltage due to the influence of a pulse current. For this reason, there may be difficulties in recognizing the charging condition based on the detected value of the battery voltage. Therefore, detecting the battery voltage for a plural number of times during charging pause and then calculating the precise battery voltage from the detected values, is being proposed (Refer to Patent Document 1).

On the other hand, in order to improve the charge-discharge cycle life, controlling the frequency of pulse charging is being proposed. For example, measuring an alternating current impedance of a battery in advance, and then charging at an arbitrary frequency at which the discrepancy of the phase relative to the applied voltage is within the range of −5 to 0 degrees, is being proposed (Refer to Patent Document 2).

The charging method as described in Patent Document 1 is a method in which the battery voltage is detected for a plural number of times during the pause period in pulse charging, the detected values are then calculated, and the calculated results are fed back to charging. For such a calculation, an A/D converter and a dedicated circuit in order to convert the battery voltage to digital signals are required. In addition, it is required to provide a pause time for voltage detection, thereby requiring a charging time longer than the charging time ordinarily required.

In addition, according to an example in Patent Document 1, the charging method is a method in which constant current charging is performed at the initial stage of charging when the battery voltage is low, and is then switched to pulse charging at a point when the battery voltage reaches a predetermined value. In such a charging method, because constant current charging is performed at the initial stage of charging, it is considered that cycle characteristics improve. However, in the case where constant current charging is performed until the battery voltage reaches about 4.2 V, the amount of electricity actually charged by the pulse current becomes small. For this reason, a period of time same as, or longer than that of the constant current-constant voltage charging, will be required.

[Patent Document 1] Japanese Patent Publication No. 3291402
[Patent Document 2] Japanese Laid-Open Patent Publication No. 2000-133320

BRIEF SUMMARY OF THE INVENTION

The present invention relates to a method of charging a non-aqueous electrolyte secondary battery including the step of: repeating pulse charging and charging pause, in which a pulse charging time is a time arbitrarily set between a lower limit value and an upper limit value, the lower limit value being: an inverse time Tx of a frequency Fx at the high frequency side at which an imaginary part of an alternating current impedance of the non-aqueous electrolyte secondary battery indicates a first local maximum value, or of a frequency adjacent to Fx; and the upper limit value being: an inverse time Ty of a frequency Fy at the low frequency side at which an imaginary part of the alternating current impedance of the non-aqueous electrolyte secondary battery indicates a second local maximum value, or of a frequency adjacent to Fy.

Here, the frequency adjacent to Fx is preferably set within the range of 0.9 Fx to 1.1 Fx. Also, the frequency adjacent to Fy is preferably set within the range of 0.9 Fy to 1.1 Fy.

One embodiment of the charging method of the present invention includes the process of setting the pulse charging time.

The process of setting the pulse charging time includes: (i) a step of measuring an alternating current impedance of a non-aqueous electrolyte secondary battery; and (ii) a step of obtaining, from the measurement result of the alternating current impedance, the inverse time Tx of the frequency Fx at the high frequency side at which an imaginary part indicates the first local maximum value, or of the frequency adjacent to Fx; and the inverse time Ty of the frequency Fy at the low frequency side at which an imaginary part indicates the second local maximum value, or of the frequency adjacent to Fy.

In the case of repeating charging and discharging for a long period of time, it is desirable that the time of the pulse charging time is reset on a regular or an irregular basis. Thus, the charging method of the present invention can further include: (A) a step of measuring an alternating current impedance of the non-aqueous electrolyte secondary battery on a regular or an irregular basis; and (B) a step of correcting the pulse charging time based on the measurement result of the alternating current impedance.

The step of correcting the pulse charging time, for example, includes a step of obtaining, from the measurement result of the alternating current impedance, an inverse time Txn of a frequency Fxn at the high frequency side at which an imaginary part indicates a first local maximum value, or of a frequency adjacent to Fxn; and an inverse time Tyn of a frequency Fyn at the low frequency side at which an imaginary part indicates a second local maximum value, or of a frequency adjacent to Fyn.

The present invention also relates to a charger including (a) an impedance measurement part for measuring an alternating current impedance of a non-aqueous electrolyte secondary battery; (b) an inverse time calculation part for calculating, from the result of the impedance measurement part, the inverse time Tx of a frequency Fx at the high frequency side at which an imaginary part indicates a first local maximum value, or of a frequency adjacent to Fx; and the inverse time Ty of the frequency Fy at the low frequency side at which an imaginary part indicates a second local maximum value, or of a frequency adjacent to Fy; (c) a pulse charging time setup part for setting the inverse time Tx and the inverse time Ty as a lower limit value and an upper limit value, respectively, and setting the pulse charging time between the lower limit value and the upper limit value; and (d) a control circuit for controlling charging of the non-aqueous electrolyte secondary battery so as to repeat pulse charging for the set pulse charging time, and charging pause.

Here, it is preferred that the control circuit has the function of instructing the impedance measurement part to measure the alternating current impedance of the non-aqueous electrolyte secondary battery on a regular or an irregular basis, and further, to instruct the inverse time calculation part and the pulse charging time setup part to correct the pulse charging time based on the result of the impedance measurement part.

The alternating current impedance may be measured in any method, but can be measured, for example, by a method which uses a frequency response analyzer (FRA method).

In the present invention, the pulse charging time capable of improving cycle life characteristics of the non-aqueous electrolyte secondary battery, is set. By optimizing the pulse charging time, the concentration of lithium ion at the electrode in the battery during charging can be substantially equalized. Due to this, because uneven charging in the electrode is reduced, charging based on high current pulse can be performed efficiently.

According to the method of the present invention, because pulse charging can be performed from the initial stage of charging, the non-aqueous electrolyte secondary battery can be charged in a short period of time, and because uneven charging in the electrode is reduced, cycle life characteristics can be improved more than by the constant current-constant voltage charging method.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a diagram in which the measurement result of the alternating current impedance of a typical non-aqueous electrolyte secondary battery is plotted on a complex plane.

FIG. 4 is a diagram in which battery capacities after 500 cycles of batteries according to Examples 1 to 6 and Comparative Examples 1 to 3, are compared.

DETAILED DESCRIPTION OF THE INVENTION

Figure 2:
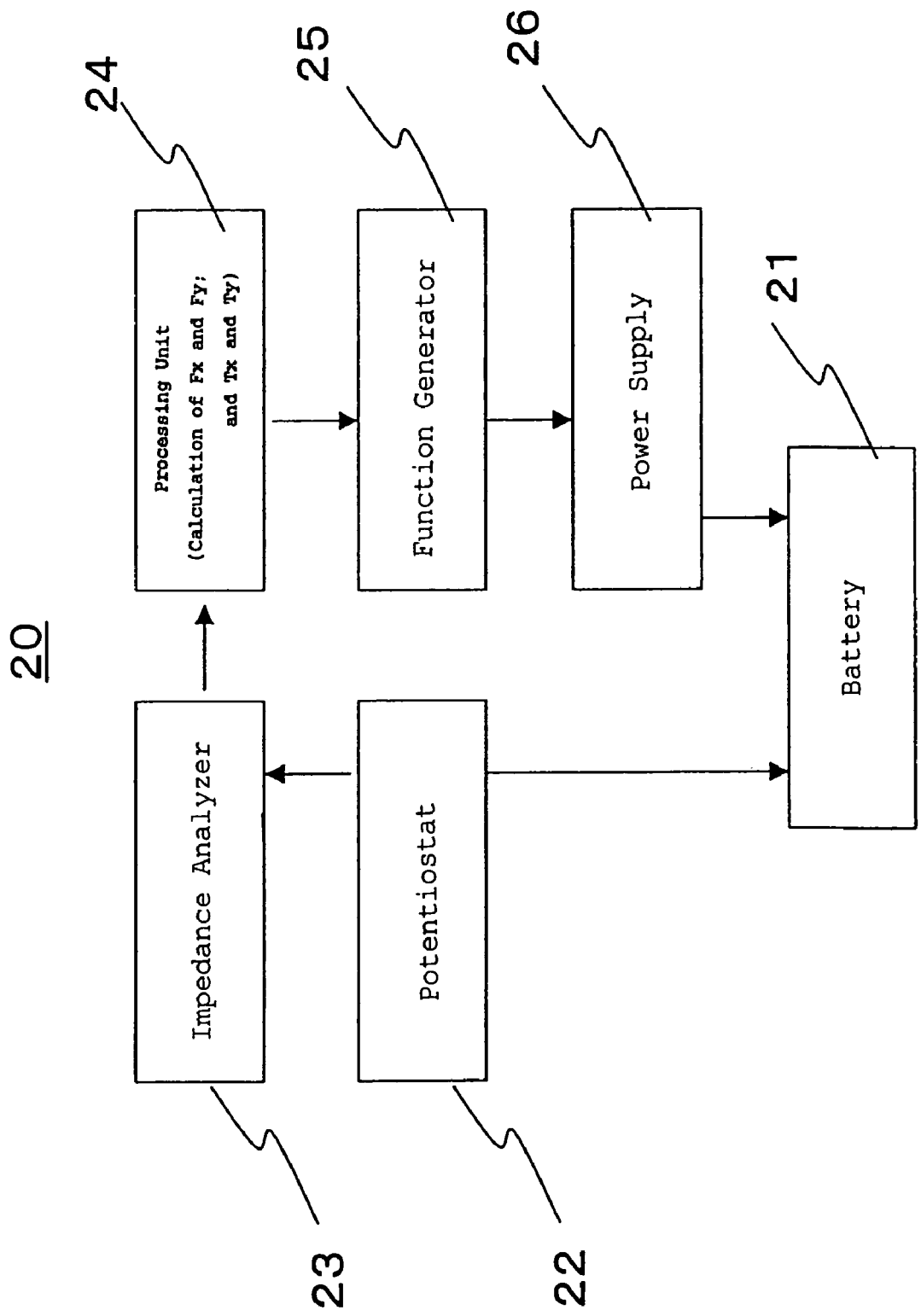
FIG. 2 is a block diagram showing the structure of one embodiment of a charger of the present invention.

A method to obtain the lower limit value and the upper limit value of the pulse charging time is described.

First, the alternating current impedance of the non-aqueous electrolyte secondary battery is measured. For example, in the case of the FRA method, a small alternating current voltage is applied to the battery, and that frequency is swept from the high frequency region to the low frequency region. The impedance of the battery at that time is output from, for example, an FRA (Frequency response analyzer) device. If the real parts and the imaginary parts output from the FRA device at a predetermined frequency interval are respectively plotted on a complex plane, of which the horizontal axis is the real axis and the vertical axis is the imaginary axis, a semicircle or an ellipse locus is output.

Here, the semicircle or the ellipse locus is described by using FIG. 1.

FIG. 1 shows the result of measuring the alternating current impedance of a typical non-aqueous electrolyte secondary battery by the FRA method and then plotting the real parts and the imaginary parts on a complex plane. The locus draws either a semicircle or a shape of an ellipse formed by two or more semicircles overlapping one another. The lower the frequency side, the larger the impedance of the real part becomes. In FIG. 1, Point 1 indicates the local maximum of the imaginary part at the high frequency side, and Point 2 indicates the local maximum of the imaginary part at the low frequency side.

The impedance (Rs) of the real part at Point 1 (the local maximum of the imaginary part at the high frequency side) indicates the sum of electronic resistance, solution resistance of an electrolyte solution, and the like. Rs represents the impedance close to the direct current resistance. On the other hand, the impedance Rct of the real part at Point 2 (the local maximum of the imaginary part at the low frequency side) is considered to indicate the impedance of the charge transfer resistance of the battery.

The lower limit value and the upper limit value of the arbitrarily-set pulse charging time, are calculated by using the frequencies of Point 1 and Point 2. Specifically, the frequencies Fx and Fy of Point 1 and Point 2 are read out, and then, the inverse times Tx (=1/Fx) and Ty (=1/Fy) of the frequencies Fx and Fy are obtained.

However, as substitutes for the frequencies Fx and Fy, the frequencies adjacent to the frequencies Fx and Fy may be used. For example, as the adjacent frequency, if a frequency within the range of 0.9 Fx to 1.1 Fx is used, a sufficiently effective inverse time Tx can be obtained, and if a frequency within the range of 0.9 Fy to 1.1 Fy is used, a sufficiently effective inverse time Ty can be obtained.

For the inverse times Tx (=1/Fx) and Ty (=1/Fy), there is a relation of Tx<Ty. Therefore, the lower limit value of the pulse charging time becomes Tx, and the upper limit value, Ty. That is, in the present invention, a pulse charging time T per one time is arbitrarily set within the range satisfying $Tx \leq T \leq Ty$.

Next, the reason for setting the pulse charging time T so as to satisfy $Tx \leq T \leq Ty$ is given.

When alternating current voltage is applied to the battery, at an extremely high frequency region, an electrochemical reaction (Faradaic reaction) does not occur, and instead, charge and discharge alternating current due to an electric double layer formed on the respective interfaces of the positive electrode and the negative electrode, flows. As the frequency of the alternating current applied to the battery is gradually swept toward low frequency, a Faradaic reaction starts to occur at a certain frequency. That frequency is the frequency Fx at Point 1 in FIG. 1.

Thus, at a frequency larger than the frequency Fx, that is, at a pulse charging time shorter than Tx, the Faradaic reaction rarely occurs, and this results in not being able to charge the battery.

Further, if the alternating current applied to the battery is swept toward the low frequency side, the imaginary part becomes small in accordance with the lowering of frequency, and subsequently, in turn, becomes large, becoming a maximum value at a certain frequency. That frequency is the frequency Fy at Point 2 in FIG. 1. The imaginary part represents the resistance component of the alternating current due to the electric double layer, and the real part represents the resistance component of the alternating current due to the Faradaic reaction. Therefore, this means that, between from Point 1 to Point 2, both of the alternating current due to the electric double layer and the alternating current due to the Faradaic reaction, are flowing.

If the alternating current applied to the battery is swept toward still lower frequency side, the real part monotonically increases, and the imaginary part monotonically decreases. Such behavior region corresponds to diffusion impedance. This region is considered to indicate the diffusion behavior of ions inside the electrode.

From the above, the following is predictable:
(1) At a frequency region greater than Point 1, the Faradaic reaction does not occur, and only the current due to the electric double layer flows.
(2) At a frequency region from Point 1 to Point 2, both the alternating current due to the Faradaic reaction and the alternating current due to the electric double layer flow.
(3) At a frequency region smaller than Point 2, the currents originating from the Faradaic reaction and the diffusion of ions inside the electrode flow.

It is considered that, at a frequency region where ions diffuse in the electrode, a concentration gradient of ions is occurring in the electrode. The concentration gradient of ions is considered to be the cause of unevenness to occur in the Faradaic reaction in the electrode. On the other hand, in the case of setting the pulse charging time T so as to satisfy $Tx \leq T \leq Ty$, the current due to the Faradaic reaction flows, but the current originating from the diffusion of ions in the electrode does not flow. Therefore, it is considered that the concentration gradient of ions in the electrode is unlikely to occur.

As the above, in the present invention, after the Faradaic reaction occurs and before the current originating from the diffusion of ions in the electrode flows, charging is paused. This enables the concentration gradient of ions in the electrode to be suppressed as low as possible. Subsequently, charging is performed again until just before the concentration gradient occurs, and then, charging is paused. By repeating such an operation, it is possible to maintain at all times a fixed concentration gradient of ions during charging. As a result, cycle life characteristics are considered to improve.

While the pulse charging time T is arbitrarily set between the lower limit value and the upper limit value, in view of performing charging more efficiently, satisfying $Tx+0.1 \times (Ty-Tx) \leq T \leq Ty$ is preferable, and satisfying $Tx+0.1 \times (Ty-Tx) \leq T \leq Tx+0.2 \times (Ty-Tx)$ is more preferable.

On the other hand, although not particularly limited, it is desirable that a pause time is 50% to 200% of the pulse charging time T. If the pause time is excessively short, the cycle life characteristics become short due to the influence of diffusion being partially saturated, and if excessively long, because a longer period of time would be required for charging, it is not practical.

The present invention can be suitably applied to in-car secondary batteries equipped in electric cars, hybrid electric cars, and the like, in addition to small secondary batteries for consumer use. In-car secondary batteries are required to maintain good cycle characteristics, even if charging and discharging are repeated for extremely long periods of time. In such a case, it is desirable to reset the time of pulse charging on a regular or an irregular basis. For example, on a regular or an irregular basis, the alternating current impedance of the battery is obtained, and from the measurement result of the alternating current impedance, the inverse time Txn of the frequency Fxn at which an imaginary part indicates the first local maximum value, or of the frequency adjacent to Fxn; and the inverse time Tyn of the frequency Fyn at which an imaginary part indicates the second local maximum value, or of the frequency adjacent to Fyn, are obtained, and then, the pulse charging time is corrected based on the inverse time Txn and the inverse time Tyn.

Charging control such as the above is performed by a charger such as the following.

FIG. 2 is a block diagram showing one embodiment of a charger.

Charger 20 includes: an impedance measurement part (potentiostat) 22 for measuring an alternating current impedance of a non-aqueous electrolyte secondary battery 21; an impedance analyzer 23 for outputting the result obtained by the impedance measurement part; and an inverse time calculation part (processing unit) 24 for obtaining the frequency Fx, the inverse time Tx, the frequency Fy, and the inverse time Ty from the result obtained by the impedance measurement part. The inverse time Tx and the inverse time Ty are sent to a pulse charging time setup part (function generator) 25, and the pulse charging time is set. In the function generator 25, a control circuit is included, which controls charging of the non-aqueous electrolyte secondary battery so as to repeat pulse charging for the set pulse charging time, and pause. The control circuit controls pulse charging of the battery 21 by a power source 26.

The control circuit, on a regular or an irregular basis, gives an instruction to the impedance measurement part 22 to measure the alternating current impedance of the non-aqueous electrolyte secondary battery 21. The measurement result of the alternating current impedance is sent to the inverse time calculation part, and the newest pulse charging time is set. Subsequently, during the interval until the next instruction to measure the alternating current impedance is given, charging is performed according to the newest pulse charging time.

EXAMPLE

Example 1

A lithium secondary battery was fabricated in the following manner:

<Fabrication of Positive Electrode>

As a positive electrode, a lithium cobalt oxide (Cell seed C) manufactured by Nippon Chemical Industrial Co., Ltd. was used. 100 parts by weight of a positive electrode active material, 4 parts by weight of acetylene black manufactured by Denki Kagaku Kogyo Kabushiki Kaisha as a conductive material, and 20 parts by weight (solid content 0.4 parts by weight) of aqueous solution of carboxymethyl cellulose sodium salt (Cellogen 4H, solid content 2 wt %) manufactured by Dai-ichi Kogyo Seiyaku Co., Ltd. as a thickener were kneaded with water in a double-armed kneader, and thus, a primary mixed product having a solid content 80 wt % was obtained.

Next, to the primary mixed product were added 4 parts by weight of polytetrafluoroethylene in a suspension state (manufactured by Daikin Industries, Ltd., solid content 10 wt %) as a binder, and thus, a positive electrode mixture paste was prepared.

The positive electrode mixture paste was applied on both surfaces of an aluminum foil of a thickness of 15 µm, the whole was dried, and then, the coating films of a total thickness of about 240 µm was pressed onto the both surfaces. Subsequently, the whole was slit to have a width of 56 mm, and thus, a positive electrode of a total thickness of 160 µm was obtained.

<Fabrication of Negative Electrode>

As a negative electrode active material, an artificial graphite was used. 100 parts by weight of a negative electrode active material, 2.5 parts by weight (solid content 1 part by weight) of styrene butadiene rubber suspension (solid content 40 wt %) manufactured by Japan Synthetic Rubber Co., Ltd. as a binder, and 1 part by weight of sodium salt of carboxymethyl cellulose as a thickener were kneaded with water in a double-armed kneader, and thus, a negative electrode mixture paste of a solid content 50 wt % was prepared.

The negative electrode mixture paste was applied on both surfaces of a copper foil of a thickness of 10 µm, the whole was dried, and then, the coating films of a total thickness of about 250 µm was pressed onto the both surfaces. Subsequently, the whole was slit to have a width of 59 mm, and thus, a negative electrode of a total thickness of 180 µm was obtained.

<Preparation of Non-aqueous Electrolyte>

To 100 parts by weight of a mixed solvent of ethylene carbonate, dimethyl carbonate, and ethyl methyl carbonate (volume ratio of 3:3:2) was added 3 parts by weight of vinylene carbonate, and further, a lithium hexafluororphosphate was dissolved so as to make its concentration 1 M, and thus, a non-aqueous electrolyte was obtained.

<Assembling of Battery>

Using a polyethylene-based microporous film of a thickness of 20 µm manufactured by Celgard Inc. (Serial No. 2320) as a separator, an electrode group for a cylindrical battery was fabricated. That is, a positive electrode and a negative electrode were wound with the separator interposed therebetween. The obtained electrode group was inserted into a Fe-based battery can plated with Ni, and to this was added 5.5 g of a non-aqueous electrolyte. Then, the opening of the battery can was sealed, and thus, a 18650 cylindrical lithium ion secondary battery with a nominal capacity of 2000 mAh was completed.

After charging the completed battery at a constant current of 400 mA until the battery voltage became 4.2 V, discharging was performed at 400 mA until the battery voltage became 2.5 V, and thus, the battery capacity of 2000 mAh was confirmed.

<Measurement of Alternating Current Impedance>

After charging the battery again until the battery voltage became 4.2V, the alternating current impedance of the battery in a charged state was measured by the FRA method. For the impedance measurement part, as a potentiostat, Solartron 1287 manufactured by Toyo Technica Co., Ltd. was used, and for the FRA (corresponds to the impedance analyzer in FIG. 2), Solartron 1255B was used. The measurement result was analyzed by using an analysis software (Zplot for Windows (Registered Trademark) Ver. 2.9b).

Figure 3:
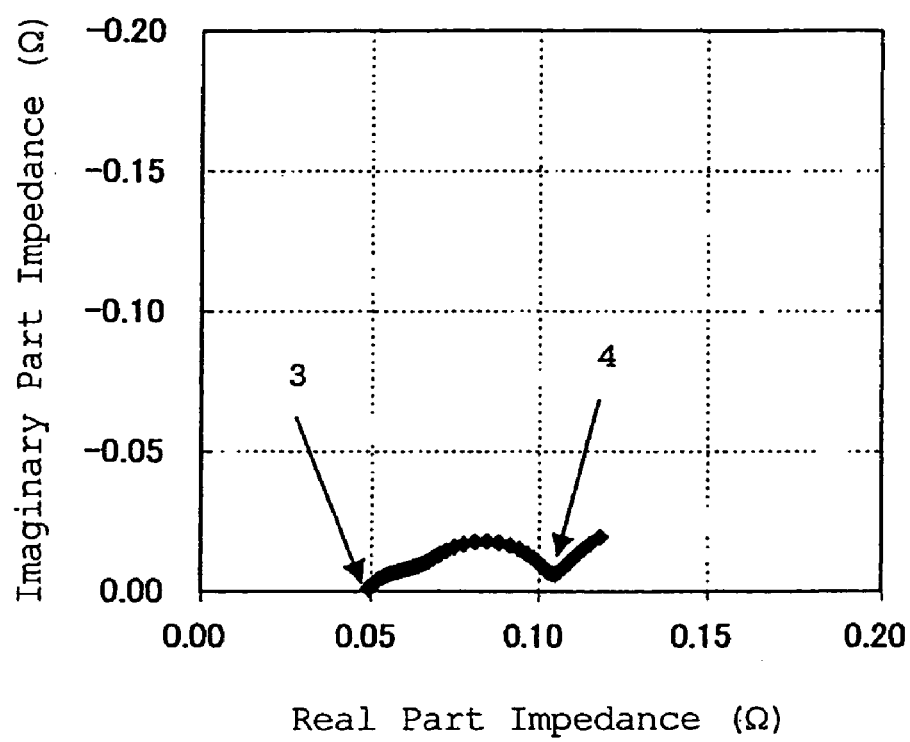
FIG. 3 is a diagram in which the measurement result of the alternating current impedance of the non-aqueous electrolyte secondary battery according to Example 1 is plotted on a complex plane.

The measurement result (complex plane plot) of the alternating current impedance is shown in FIG. 3.

The frequency Fx (the frequency at Point 3) at which an imaginary part indicates the first local maximum value at the high frequency side, was 630 Hz, and the inverse time was about 0.0016 second.

The frequency Fy (the frequency at Point 4) at which an imaginary part indicates the second local maximum value at the low frequency side, was 1 Hz, and the inverse time was 1 second.

Due to the above, the lower limit value and the upper limit value of the pulse charging time became, respectively, 0.0016 second and 1 second.

In the present example, the pulse charging time was set to 1 second.

In the pattern of charging for 1 second (the set pulse charging time) at a current of 2000 mA and then pausing for 1 second, a battery was charged until the battery voltage became 4.2 V. The battery after charge termination was discharged at 400 mA until the battery voltage became 2.5 V, and thus, the battery capacity was confirmed.

After this pulse charge-discharge cycle was repeated 500 times, the capacity after 500 cycles was 1620 mAh.

Example 2

To a battery fabricated in exactly the same way as in Example 1, other than setting the pulse charging time to 0.5 second and the pause time to 0.5 second, the same pulse charge-discharge cycle as in Example 1 was repeated 500 times. The capacity after 500 cycles was 1650 mAh.

Example 3

To a battery fabricated in exactly the same way as in Example 1, other than setting the pulse charging time to 1 second and the pause time to 0.1 second, the same pulse charge-discharge cycle as in Example 1 was repeated 500 times. The capacity after 500 cycles was 1600 mAh.

Example 4

To a battery fabricated in exactly the same way as in Example 1, other than setting the pulse charging time to 0.1 second and the pause time to 1 second; the same pulse charge-discharge cycle as in Example 1 was repeated 500 times. The capacity after 500 cycles was 1700 mAh.

Example 5

To a battery fabricated in exactly the same way as in Example 1, other than setting the pulse charging time to 0.5 second and the pause time to 1 second, the same pulse charge-discharge cycle as in Example 1 was repeated 500 times. The capacity after 500 cycles was 1685 mAh.

Example 6

To a battery fabricated in exactly the same way as in Example 1, other than setting the pulse charging time to 0.0016 second and the pause time to 0.5 second, the same pulse charge-discharge cycle as in Example 1 was repeated 500 times. The capacity after 500 cycles was 1620 mAh.

Comparative Example 1

To a battery fabricated in exactly the same way as in Example 1, other than setting the pulse charging time to 1.5 seconds and the pause time to 1 second, the same pulse charge-discharge cycle as in Example 1 was repeated 500 times. The capacity after 500 cycles was 1380 mAh.

Comparative Example 2

To a battery fabricated in exactly the same way as in Example 1, other than setting the pulse charging time to 1.5 seconds and the pause time to 1.5 seconds, the same pulse charge-discharge cycle as in Example 1 was repeated 500 times. The capacity after 500 cycles was 1300 mAh.

Comparative Example 3

To a battery fabricated in exactly the same way as in Example 1, other than setting the pulse charging time to 3 seconds and the pause time to 1.5 seconds, the same pulse charge-discharge cycle as in Example 1 was repeated 500 times. The capacity after 500 cycles was 1000 mAh.

A graph which compares the capacities of the batteries of Examples 1 to 5 after 500 cycles and the capacities of the batteries of Comparative Examples 1 to 3 after 500 cycles is shown in FIG. 4.

From these results, it was found that cycle life characteristics of the battery improve by making the pulse charging time no shorter than the inverse time Tx of the frequency Fx at the high frequency side at which an imaginary part of the alternating current impedance indicates the first local maximum value, or of the frequency adjacent to Fx; and no longer than the inverse time Ty of the frequency Fy at the low frequency side at which an imaginary part indicates the second local maximum value, or of the frequency adjacent to Fy.

While the present invention can be applied to non-aqueous electrolyte secondary batteries in general that are chargeable by the pulse charging method, by particularly applying to power sources for portable equipments of high capacity, power sources for electric cars, power sources for hybrid electric cars, and the like, significant effects can be obtained.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for charging a non-aqueous electrolyte secondary battery comprising the step of:
   repeating pulse charging and charging pause,
   wherein a pulse charging time is arbitrarily set between a lower limit value and an upper limit value,
   said lower limit value being an inverse time Tx of a frequency Fx at the high frequency side at which an imaginary part of an alternating current impedance of said non-aqueous electrolyte secondary battery indicates a first local maximum value, or of a frequency adjacent to Fx, and
   said upper limit value being an inverse time Ty of a frequency Fy at the low frequency side at which an imaginary part of the alternating current impedance of said non-aqueous electrolyte secondary battery indicates a second local maximum value, or of a frequency adjacent to Fy.

2. The method for charging a non-aqueous electrolyte secondary battery in accordance with claim 1,
   wherein said frequency adjacent to Fx is within the range of 0.9 Fx to 1.1 Fx, and said frequency adjacent to Fy is within the range of 0.9 Fy to 1.1 Fy.

3. The method for charging a non-aqueous electrolyte secondary battery in accordance with claim 1, further comprising: measuring an alternating current impedance of said non-aqueous electrolyte secondary battery on a regular or an irregular basis, and correcting said pulse charging time based on the measurement result of the alternating current impedance.

4. The method for charging a non-aqueous electrolyte secondary battery in accordance with claim 3,
   wherein the step of correcting said pulse charging time includes:
   obtaining, from said measurement result of the alternating current impedance, an inverse time Txn of a frequency Fxn at which an imaginary part indicates a first local maximum value, or of a frequency adjacent to Fxn, and
   obtaining an inverse time Tyn of a frequency Fyn at which an imaginary part indicates a second local maximum value, or of a frequency adjacent to Fyn.

5. A charger comprising:
   an impedance measurement part for measuring an alternating current impedance of a non-aqueous electrolyte secondary battery;
   an inverse time calculation part for obtaining, from the result from said impedance measurement part, an inverse time Tx of a frequency Fx at the high frequency side at which an imaginary part indicates a first local maximum value, or of a frequency adjacent to Fx, and an inverse time Ty of a frequency Fy at the low frequency side at which an imaginary part indicates a second local maximum value, or of a frequency adjacent to Fy;
   a pulse charging time setup part for setting said inverse time Tx and said inverse time Ty as a lower limit value and an upper limit value, respectively, and setting a pulse charging time between said lower limit value and said upper limit value; and
   a control circuit for controlling charging of said non-aqueous electrolyte secondary battery so as to repeat pulse charging for said set pulse charging time, and pause.

6. The charger in accordance with claim 5,
   wherein said control circuit, on a regular or an irregular basis, instructs said impedance measurement part to measure the alternating current impedance of said non-aqueous electrolyte secondary battery, and further, instructs said inverse time calculation part and said pulse charging time setup part to correct the pulse charging time based on the result from said impedance measurement part.

* * * * *